Figure 1:
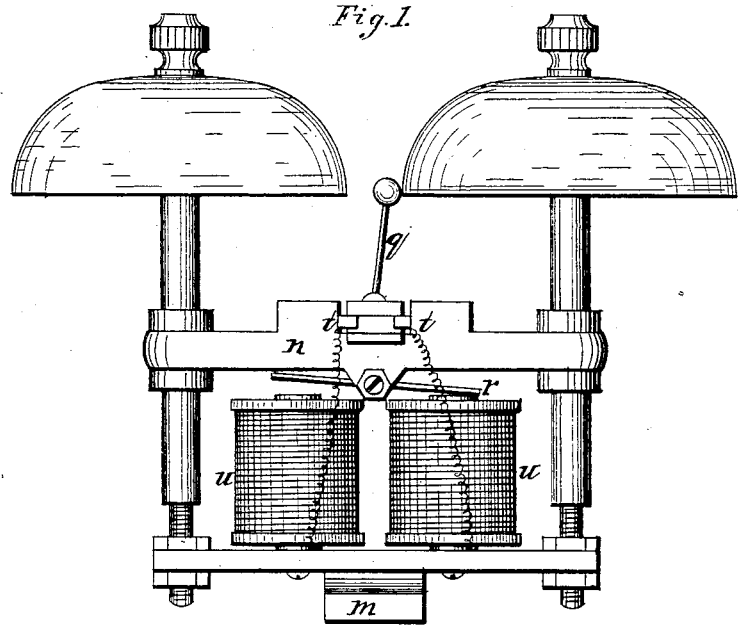

(No Model.) 2 Sheets—Sheet 1.
E. P. WARNER.
Pole Changer for Telephone Exchanges.
No. 238,263. Patented March 1, 1881.
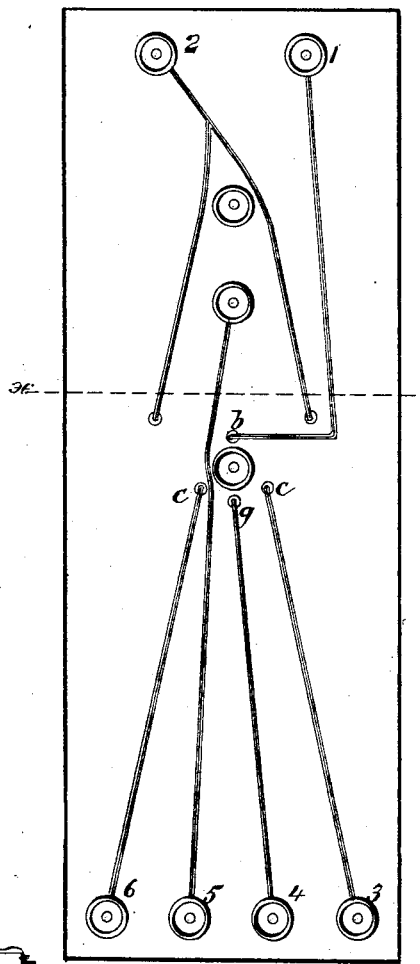
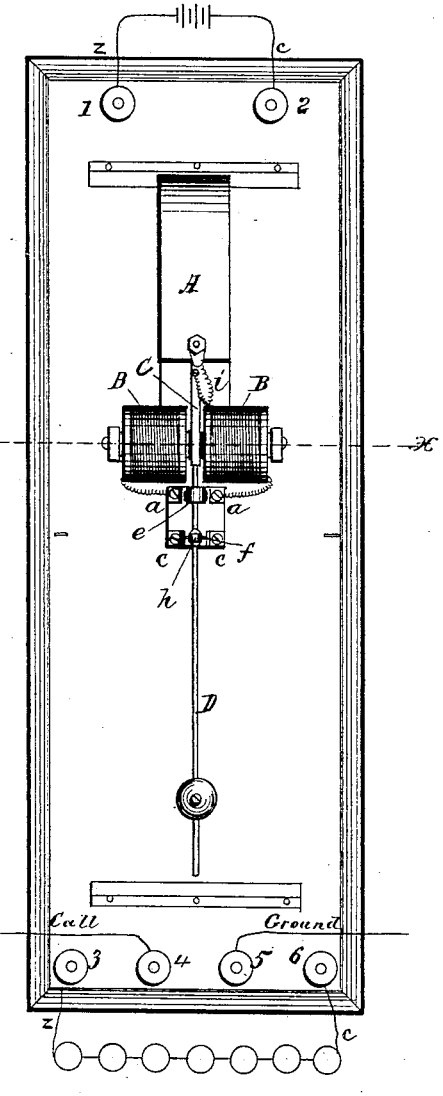
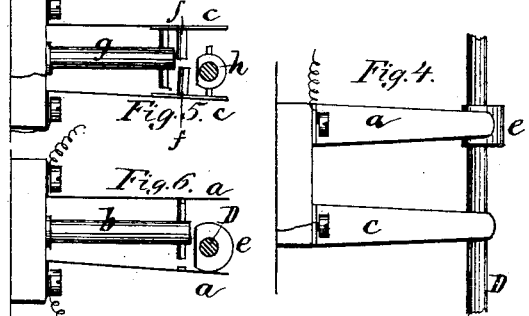
Witnesses
G. L. Clausen
James L. Baird
Inventor
Ernest P. Warner
By George P. Barton
Attorney.

(No Model.) 2 Sheets—Sheet 2.

E. P. WARNER.
Pole Changer for Telephone Exchanges.

No. 238,263. Patented March 1, 1881.

Witnesses
Herbert B. Johnson
Geo. A. Scott

Inventor
Ernest P. Warner
by George P. Barton
Attorney

United States Patent Office.

ERNEST P. WARNER, OF CHICAGO, ILLINOIS, ASSIGNOR TO WESTERN ELECTRIC MANUFACTURING COMPANY, OF SAME PLACE.

POLE-CHANGER FOR TELEPHONE-EXCHANGES.

SPECIFICATION forming part of Letters Patent No. 238,263, dated March 1, 1881.

Application filed August 16, 1880. (No model.)

*To all whom it may concern:*

Be it known that I, ERNEST P. WARNER, of Chicago, in the county of Cook and State of Illinois, have invented certain new and useful Improvements in Pole-Changers for Telephone-Exchanges, of which the following is a full, clear, concise, and exact description, reference being had to the accompanying drawings, forming a part of this specification, and in which like letters of reference indicate the same parts upon the respective sheets thereof.

By the use of my invention the central office is enabled to send out on a line what are usually termed "to-and-fro currents," for the purpose of ringing the magneto or gravity bell of a subscriber, and also the central office is enabled to ring up a subscriber by simply connecting a battery to line and allowing it to remain as long as it is desired to continue the call. This work is done by simply depressing a button or key connected with the pole-changer or battery, as the case may be, after having made the proper connections on the switch-board with the line.

Heretofore in order to call up a subscriber it has been necessary to use a magneto-generator, and to continue turning during the entire time of calling, which, in a large office, would be nearly all the time.

The pendulum shown in Sheet 1 of the drawings is kept vibrating continually by means of a cell of local battery provided for each pole-changer. The main battery should be such as will admit of several calls being sent out at the same time.

The pole-changer is so constructed that in its reversal of the poles it cannot short-circuit the calling-battery, but, instead, leaves the line open for a short time between the reversals, the object of this being to prevent waste of battery material, and also to cause the gravity or single-stroke bells to ring as though the line were simply opened and closed without reversing the battery.

The following description of the drawings will make clear the way in which I have used my invention.

Sheet 1 represents different views of the pole-changer, a single one being provided at the central office for each of the several subscribers. Sheet 2 represents different views of the several parts of my invention, which may be considered as a part of the pole-changer inverted. The bell-hammer, being used instead of the pendulum, as it vibrates, strikes against bells placed at a convenient distance, as shown.

My invention may thus be applied in various ways.

Figure 2:
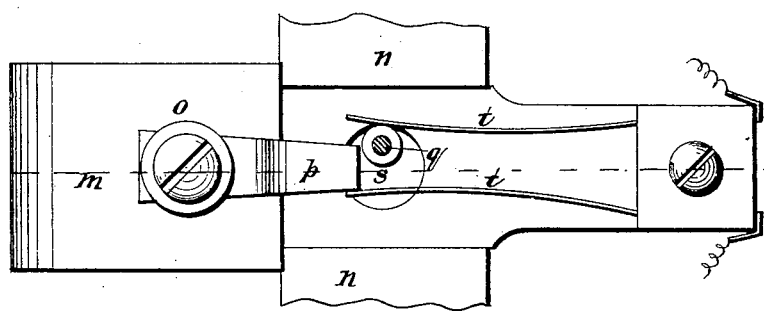
Figure 3:
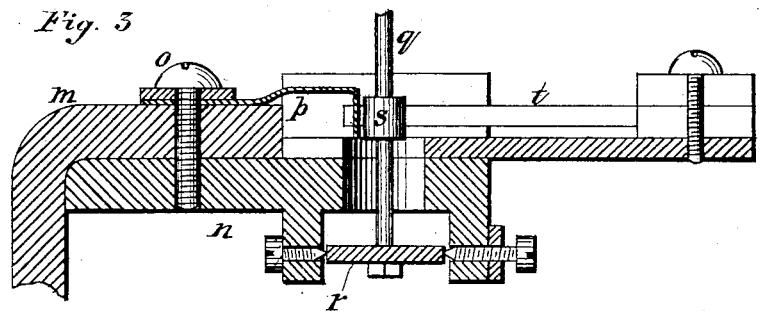

In the drawings, Sheet 1, Figure 1 represents a front elevation of my pole-changer; Fig. 2, a back elevation, showing the wires connecting the several parts of the instrument. Fig. 3 is a transverse section upon the lines $x\ x$, Figs. 1 and 2. Figs. 4, 5, and 6 are detail views of the pole-changer springs, local springs, and pendulum-rod.

The permanent magnet A acts upon the core of the electro-magnet B, and also upon the iron tongue C, which forms the upper portion of the pendulum D, as is usual in the case of all polarized relays or bells.

I will describe the action of the local battery on the supposition that the inner ends of the cores are polarized N, and the lower portion of the soft-iron tongue C polarized S.

Now, on connecting the local battery to the terminals 1 and 2 in the direction indicated by the letters $c$ and $z$, the current flowing from terminal 2 will pass by the wires shown in Fig. 2 to the inner ends of the wires on each helix. The pendulum being in the position shown in Fig. 1, both contact-springs $a\ a$ being in contact with center post, $b$, the current will be equally divided between the electro-magnets, and will return to terminal 1 and the $z$ pole of the local battery by the wire shown in Fig. 2. While in this position the electro-magnets, remaining neutral, do not act upon the lower portion of the tongue C, which hangs between the magnets, as shown in Fig. 1; but on moving the pendulum in either direction, the contact-spring on the side toward which it is moved will be carried away from the center post, and the current will then flow wholly through the electro-magnet on the opposite side, which will increase the polarity of its core. At the same time the polarity of the opposite core is diminished. Thus the iron tongue will be acted upon so as to bring the pendulum back, and the momentum acquired will cause the pendulum to swing far enough to remove the other local contact-spring from contact with the center post, and the current will pass through the other magnet. The action of the local current is now changed or reversed, and the pendulum returns in the direction first given, its momentum being sufficient to remove the spring from contact on that side. A continuous oscillation of the pendulum D is thus obtained, its rate being governed by a sliding weight, as shown.

The collar e, of hard rubber or other insulating material, is placed on the pendulum-rod between the contact-springs a a, to prevent contact between the springs and rod during its oscillations.

We now come to the main or calling battery, which has its poles connected to the terminals 3 and 6, Fig. 1. These are in turn connected by wires (shown in Fig. 2) with the contact-springs c c, which springs are preferably faced with platinum on their inner surfaces, and provided with non-conductive points f f, of such length that when in contact they serve to prevent simultaneous contact between the two springs and center post, thus preventing short-circuiting the main battery. A metal collar, h, having a contact-point, preferably of platinum, on each side, is placed on the pendulum D, between the springs c c, and comes alternately in contact with them as the pendulum swings from side to side. The momentum of the pendulum carries the spring on one side away from the center post, g, and allows the spring on the other side to remain in contact with the post. The pendulum is connected, through the small spiral wire spring i, Fig. 1, permanent magnet A, and wire shown in Fig. 2, with terminal 5. The center post, g, is connected with terminal 4, Fig. 2. The contact-springs c c are so adjusted with reference to the pendulum-rod that on breaking contact with the spring on one side a short time is allowed to elapse before it comes in contact with the other spring, causing the circuit to remain open, and the hammer of any gravity or single-stroke bell to drop back if placed in circuit. Terminal 5 is connected with the ground, and terminal 4 to the call-strap or key-board of the universal switch. Having all these parts properly connected, the vibrations of the pendulum caused by the local battery will, by its movement of the springs c c, cause the poles of the calling-battery to be reversed at every oscillation, and when the wire from terminal 4 is connected to any line the currents of opposite polarity will continue to traverse the line as long as contact is made.

When it is desired to apply this invention for calling up a subscriber by means of a battery placed to line without reversals, I place a vibrating bell, such as shown in drawings, Sheet 2, at each station, the mode of operation of this vibrating bell being similar in all essential features to the operation of the local circuit of the pole-changer before described, and shown in Sheet 1, dispensing with the pole-changer springs proper, and so adjusting the vertical bell-hammer that on whichever side it may lean its weight will be sufficient to cause the spring on that side to leave central contact-stop, p.

In this drawing, Fig. 1 represents a vibrating magneto-bell placed at any point in a circuit, the current being continuous in one direction. Figs. 2 and 3 are detail views of parts embodying my improvements.

The permanent magnet m is attached to the upper iron cross-frame, n, by means of screw o, which screw holds the center contact-stop, p, rigidly in place.

The bell-hammer wire q is attached to the armature r at its lower end, and has a collar of hard rubber, s, so placed as to come even with and directly opposite to the stop p. The object of this insulating-collar is to allow the wire q in its vibrations to carry the springs t t away from the contact-stop without making electrical contact with the springs.

The contact-stop p is connected directly to line. The springs t t are connected, by the spiral wires shown in Fig. 1, with the outer ends of the helices u. The inner ends of the wires of the helices are connected together and to line or ground.

A battery may be placed in the circuit, and if the poles of the battery are properly arranged with reference to the bell, the bell will commence vibrating or ringing, and will continue to do so until the battery is reversed or the circuit opened. The bell can also be operated by the ordinary magneto-generator. Two of these bells, when placed in a single circuit, can be so arranged that one of them can be operated by a current having a certain direction, while the other will remain silent. When the current is reversed the bell that was silent before becomes active, while the one that was previously active becomes silent.

In order to call a subscriber on any line it is only necessary to connect a battery to line with the proper pole for the bell which it is desired to ring, and to allow the circuit to remain closed as long as may be necessary. The object effected is reduction of the induction caused on telephone-lines by the ordinary method of signaling subscribers with magneto-generators or reversed batteries, the only induction of any moment which occurs in using this call being that which is caused by closing and opening the calling-battery. Since there is no break or reversal of the current in the line, and the change of resistance while the bell is in operation is very small, little or no extra current is produced, and consequently no troublesome induction.

I claim—

1. The combination, substantially as herein described, of the permanent magnet, electro-magnet, and armature-carrying wire, with the two springs from which the wire is insulated, and which are alternately brought into electric contact with the central post by the wire as it is carried in either direction by the armature when actuated by the electric current passing through the electro-magnet.

2. Contact-springs $c\ c$, provided with non-conductive points $f\ f$, so combined with central post, $g$, mechanism for operating said springs, and battery that the poles of the battery are reversed without short-circuiting the battery as the springs are alternately carried away from the central post.

3. Pendulum D, contact-springs $c\ c$, non-conductive points $f\ f$, post $g$, and battery, combined substantially as specified.

ERNEST P. WARNER.

Witnesses:
  JAMES L. BAIRD,
  GEO. A. SCOTT.